Aug. 27, 1957   A. DE ANGELIS ET AL   2,803,994
OPHTHALMIC MOUNTINGS
Filed Feb. 15, 1955

INVENTOR
ARMAND DE ANGELIS
HENRY C. TIMPF
BY
Louis L. Gagnon
ATTORNEY

United States Patent Office 2,803,994
Patented Aug. 27, 1957

2,803,994

OPHTHALMIC MOUNTINGS

Armand De Angelis, Southbridge, and Henry C. Timpf, Dudley, Mass., assignors to American Optical Company, Southbridge, Mass., a voluntary association of Massachusetts Application February 15, 1955, Serial No. 488,268

4 Claims. (Cl. 88—41)

This invention relates to ophthalmic mountings and has particular reference to an improved temple endpiece construction.

One of the principal objects of this invention is to provide novel means and method of securing hinges or the like to parts such as endpieces and/or temples of ophthalmic mountings whereby the securement means will relatively permanently secure said hinges to the respective parts of said mounting and be adapted to detachably receive decorative trim members or the like.

Another object is to provide temple hinge assemblies for ophthalmic mountings comprising hinge plates attached to the temporal ends of an ophthalmic mounting by means of hollow grommets or the like, whereby the openings through said grommets provide means whereby decorative trims may be readily attached to said mountings.

Another object is to provide an ophthalmic mounting comprising endpiece structures of the above character wherein various types and styles of decorative trim members may be quickly and easily attached to or detached from said mounting without disturbing the temple hinge connection means provided thereon.

Another object is to provide detachable trim members which are adapted to be positioned upon the temporal endpieces of an ophthalmic mounting of the above character and retained in precise alignment therewith regardless of the shock or abuse encountered in the normal use of such mounting.

Another object is to provide an ophthalmic mounting having temple hinge connection means of the above character which are adapted to be used with or without trim members attached thereto.

Another object is to provide temple hinge connection means of the above character which are relatively simple in construction, economical to manufacture and efficient in use.

Other objects and advantages of the invention will become apparent from the following description taken in conjunction with the accompanying drawings and it will be apparent that many changes may be made in the details of construction, arrangement of parts and method shown and described without departing from the spirit of the invention as expressed in the accompanying claims. We, therefore, do not wish to be limited to the exact details of construction, arrangement of parts and method shown and described as the preferred forms only have been given by way of illustration.

Referring to the drawings.

Figure 1:
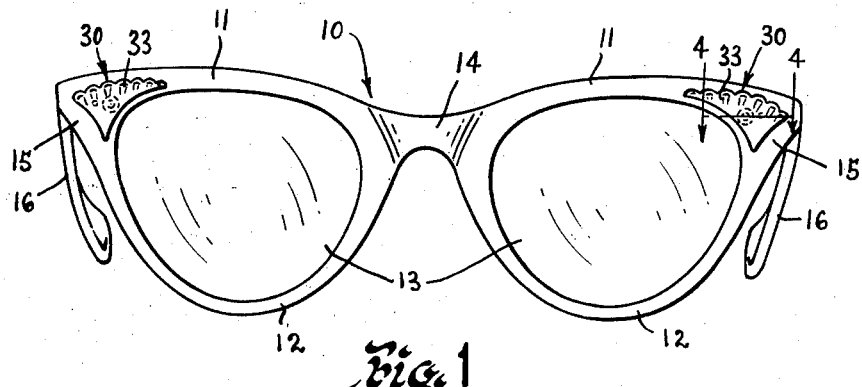
Fig. 1 is a front elevational view of an ophthalmic mounting embodying the invention.

Referring more particularly to the drawings wherein like characters of reference designate like parts throughout the several views, Fig. 1 illustrates an ophthalmic mounting embodying the invention and comprises a nonmetallic frame or the like 10 having upper and lower rimlike portions 11 and 12, respectively, which preferably completely encircle and support a pair of lenses 13. The upper and lower portions 11 and 12 are integrally connected at the nasal ends thereof and are constructed so as to form a connecting portion or bridge 14 whereas the opposed ends of said upper and lower portions 11 and 12 are integrally joined by enlarged portions shaped into endpieces 15.

Figure 2:
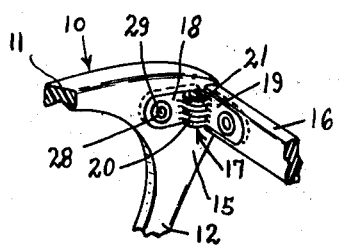
Fig. 2 is a rear perspective view of a temporal portion of the mounting of Fig. 1 showing the structure embodying the invention.

A temple 16 is pivotally connected to each endpiece 15 by means of a hinge 17 as shown in Fig. 2. The hinge 17 may be of any suitable construction comprising two separate hinge plates 18 and 19 which are adapted to be mounted on the endpieces 15 and temple 16, respectively. Each hinge plate 18 and 19 is formed with a selected number of hinge ears 20 and 21, respectively, which are adapted to interfit with one another as shown in Fig. 2. The ears 20 and 21 are provided with aligned openings therein in which a screw or other suitable type of hinge pintle is secured.

Figure 4:
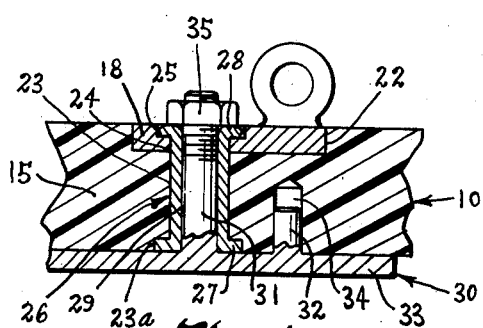
Fig. 4 is an enlarged fragmentary cross-sectional view taken on line 4—4 of Fig. 1.

The rear surfaces of the endpieces 15 are each provided with a recessed area 22, the configuration of said area being substantially the same as the peripheral shape of the hinge plate 18 and of a depth substantially equal to the thickness of said hinge plate 18 as shown best in Figs. 2 and 4 and an opening or hole 23 is also provided in each of the endpieces 15 which extends forwardly from the recessed area 22 through the thickness of the endpiece 15. The forward end of said hole 23 is counterbored as shown at 23a in Fig. 4 and an opening 24, of substantially the same diameter as hole 23, is provided in the hinge plate 18. The opening 24 is also counterbored, as shown at 25 in Fig. 4, to receive a portion of a connecting member to be described in detail hereinafter.

Figure 5:
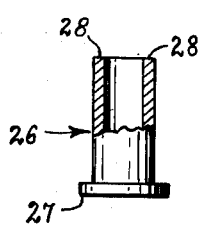
Fig. 5 is an enlarged side view, partially in section, of a hollow connecting member used to assemble a hinge plate and an endpiece of the type embodying the invention.

To connect the hinge plate 18 to the endpiece 15, the hinge plate 18 is initially positioned within the recess 22 whereupon the hole 23 and opening 24 will be automatically aligned and a tubular connecting member 26 having an enlarged shouldered portion or head 27 formed thereon, as shown in Fig. 5, is inserted into the aligned hole 23 and opening 24 with its head 27 positioned within the counterbored portion 23a of hole 23, Fig. 4. The head 27 of said tubular connecting member 26 is preferably formed of a diameter substantially equal to the diameter of the counterbore 23a and of a thickness substantially equal to the depth of said counterbore so as to fit snugly therein with its outer face substantially in flush relation with the forward surface of endpiece 15 and the outer diameter of the remaining portion of said connecting member 26 is substantially equal to the diameter of the aligned hole 23 and opening 24 so as to provide an intimate fit therebetween.

Having thus positioned the tubular connecting member 26 within the endpiece 15 and hinge plate 18 as described above, the end 28 of said tubular connecting member is flared outwardly and into the counterbored portion 25 of the hinge plate 18 as shown in Fig. 4 so as to securely maintain said hinge plate in connected relation with the endpiece 15.

It is to be pointed out that by properly controlling the overall length of tubular connecting member 26 and the depth and diameter of counterbores 25 and 23a, that the flared end portion 28 of said tubular connecting member 26 will be completely contained within said counterbore 25 having the outer surface thereof in flush relation with the outer surface of said hinge plate 18 and that since the configuration of the recess 22 is substantially the same as the periphery of the hinge plate, said hinge plate will be restricted from any rotational movement when secured therein.

While the foregoing description refers primarily to the attachment of hinge plate 18 to endpiece 15, it is to be understood that a hinge plate 19 may be similarly secured to a temple 16 as shown in Fig. 2 or other parts may be likewise joined.

Since the connecting member 26 is tubular as described above, the hollow interior of said connecting member then forms an opening 29 which is adapted to receive the attachment portion of a decorative trim member 30.

The trim member 30 comprises a threaded lug 31 and an aligning pin 32 integrally formed with or connected to the rear surface of a platelike portion 33 of said trim member 30 and the front surface of said platelike portion 33 is preferably provided with a decorative effect such as engraving, coloring, jewel studding, etc.

Figure 3:
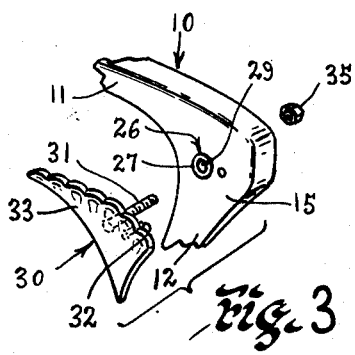
Fig. 3 is an exploded front perspective view of the temporal end portion of the above ophthalmic mounting showing a method of attaching a decorative trim or the like thereto.

In order to position the trim member 30 upon endpiece 15 and maintain said trim member in aligned relation therewith, an opening 34 of substantially the same diameter as that of aligning pin 32 is provided in the endpiece 15 as shown in Figs. 3 and 4. Said opening 34 extends rearwardly into the material of the endpiece a distance slightly greater than the length of pin 32. Trim member 30 may then be positioned upon endpiece 15 as shown in Figs. 1 and 4 by inserting the threaded stud 31 into opening 29 and forcing said trim member inwardly against the front surface of endpiece 15 simultaneously with the pin 32 being aligned with and positioned within opening 34.

As shown in Fig. 4, the threaded stud 31 is of a length sufficient to extend slightly beyond the outer surface of hinge plate 18 so as to receive a threaded retaining nut 35, or the like, thereon and by properly tightening said nut 35 the platelike portion 33 will be caused to intimately engage the front surface of endpiece 15 and be retained in alignment thereon by means of pin 32 and opening 34, as well as retaining nut 35.

By removing nut 25 it can be seen that decorative trim members of the type described may be quickly and easily removed from the mounting for cleaning, interchangement or replacement purposes while the hinge plate 18 remains securely positioned upon said endpiece and it is also to be pointed out that trim members of the character described may be positioned in a similar manner upon temple pieces, etc.

Figure 6:
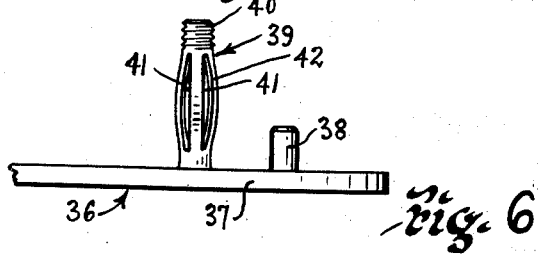
Fig. 6 is an enlarged cross-sectional view of a modified form of a decorative trim member embodying the invention.

In Fig. 6 there is shown a modified form of trim member 36, which, similar to the other trims, comprises a platelike portion 37 having an aligning pin 38 and a connection lug 39 thereon. The connection lug 39, in this instance, comprises a tubular member formed of beryllium copper, stainless steel or other suitable resilient material having a threaded end 40 for receiving a nut similar to the nut 35 thereon. The tubular member is provided with a plurality of circumferentially spaced longitudinal slots 41 in the sides thereof to provide resilient rib portions 42 between said slots. The rib portions are bent so as to curve outwardly intermediate the ends thereof so that they will have a resilient gripping fit within the bore of the tubular member 33 when the trim is fitted in place on the mounting. This provides an arrangement whereby the trims may be readily placed on and removed from the mounting for proper selection of design by the patient and with the resilient ribs firmly holding the trims in place. While the spring ribs 42 are cupped outwardly so as to have a diameter greater than the diameter of the bore of the tube 23 and so as to have a gripping action therewith when the trim is forced into desired assembled relation with the mounting, the threaded end 40 of the tubular lug provides additional means whereby a nut similar to the nut 35 may be placed thereon to insure permanent attachment of the trim with the mounting. The spring ribs 42 further function to eliminate any looseness and play which might otherwise exist in the assembly, and the pin 38 fitting within the opening 34 will hold the trim against rotation about the lug 39.

The connecting members 26 are made in the form of tubular members or grommets, as stated above, because of the restricted area which is available at the temporal sides of the mounting and thereby obviate the need of providing additional connection openings for the detachable trims. If, because of the restricted area available, such connection openings are formed in the rims of the mounting, as has been the case in many instances in the past, they cause an undesirable weakening at said locations. The tubular connection means and grommets, therefore, provide for the reception of such connection means of the trims without, in any way, weakening the mounting or requiring additional attachment openings. The connection means or grommets firmly hold the hinge plates in place and this holding action is in no way altered by the interchangement of trims.

From the foregoing description it will be seen that simple, efficient and economical means and method have been provided for accomplishing all of the objects and advantages of the invention.

Having described our invention we claim:

1. In a temple hinge connection for an ophthalmic mounting, the combination of an endpiece having recesses in the opposed side surfaces thereof and an opening extending therethrough and communicating with said recesses, a hinge plate in one of said recesses and shape to the contour shape thereof and to relatively intimately fit with the side walls of said recess and having an opening therein in aligned relation with the opening in said endpiece and a counterbore in the outer surface thereof communicating with the opening, a hollow tubular member extending through said aligned openings and having an enlarged head portion on one end thereof lying within the other of said recesses in said endpiece and having a flared end portion lying within the counterbore in the hinge plate and a decorative trim comprising a platelike portion having a projection extending outwardly of one side surface thereof and shaped to fit and be detachably bindingly held in the tubular member to secure said trim to said mounting.

2. In an ophthalmic mounting the combination of a lens supporting structure having a section provided with spaced connection openings therein, recessed areas on the opposed sides of said section each communicating with the opposed ends of one of said connection openings, a perforated hinge plate positioned within one of said recessed areas with its perforation aligned with said communicating connection opening and having a counterbore communicating with the outer end of said perforation, a tubular connection member positioned in said connection opening and extending through the perforation of the hinge plate, said tubular connection member having an enlarged head portion positioned within the other of said recessed areas with its outer surface substantially flush with the adjacent outer surface of said section and having its opposed end flared outwardly to lie within the counterbore in said hinge plate with its outer surface substantially flush with the adjacent surface of said hinge plate and to firmly anchor said hinge plate in the adjacent recessed area of said section, and a member embodying a platelike portion having a pin and a spaced attachment lug extending outwardly of a side surface thereof, said attachment lug being shaped to fit and be detachably held in the tubular connection member with the spaced pin lying within the spaced opening in said section.

3. In an ophthalmic mounting the combination of a lens supporting structure having an endpiece with a connection opening extending therethrough and having a spaced perforation therein, recessed areas on the opposed sides of said endpiece each communicating with said connection opening, a hinge plate lying within one of said recesses and having an opening aligned with the connection opening in said endpiece, said hinge plate having a counterbore in the outer surface thereof of a size and shape similar to the recess in the surface of said endpiece opposed to said hinge plate, a hollow tubular member fitted within said aligned opening and having an enlarged head fitted within the recess in the surface of said endpiece opposed to said hinge plate with its outer surface in substantially flush relation with the adjacent outer surface of said endpiece and having its opposed end flared outwardly so as to lie within said counterbore in substantially flush relation with the outer surface of said hinge plate and a member embodying a platelike portion having a projection and a spaced pin on a side surface thereof, said projection being dimensioned and shaped to be extended within the bore of the tubular member with the spaced pin lying within the aperture in said endpiece and having a threaded end portion for receiving a nut for detachably connecting said member to the endpiece.

4. In an ophthalmic mounting the combination of a lens supporting structure having an endpiece with a connection opening extending therethrough and having a spaced perforation therein, recessed areas on the opposed sides of said endpiece each communicating with said connection opening, a hinge plate lying within one of said recesses and having an opening aligned with the connection opening in said endpiece, said hinge plate having a counterbore in the outer surface thereof of a size and shape similar to the recess in the surface of said endpiece opposed to said hinge plate, a hollow tubular member fitted within said aligned openings and having an enlarged head fitted within the recess in the surface of said endpiece opposed to said hinge plate with its outer surface in substantially flush relation with the adjacent outer surface of said endpiece and having its opposed end flared outwardly so as to lie within said counterbore in substantially flush relation with the outer surface of said hinge plate and a member embodying a platelike portion having a projection formed with an expandable and contractable portion and a spaced pin on a side surface thereof, said projection being dimensioned and shaped to be frictionally extended and held within the bore of the tubular member with said spaced pin lying within the aperture in said endpiece.

References Cited in the file of this patent
UNITED STATES PATENTS

| | | |
|---|---|---|
| 1,576,869 | Stevens et al. | Mar. 16, 1926 |
| 2,172,959 | Hirtenstein | Sept. 12, 1939 |
| 2,682,199 | Weissman | June 29, 1954 |